INVENTOR.
RONALD M. FIANDT

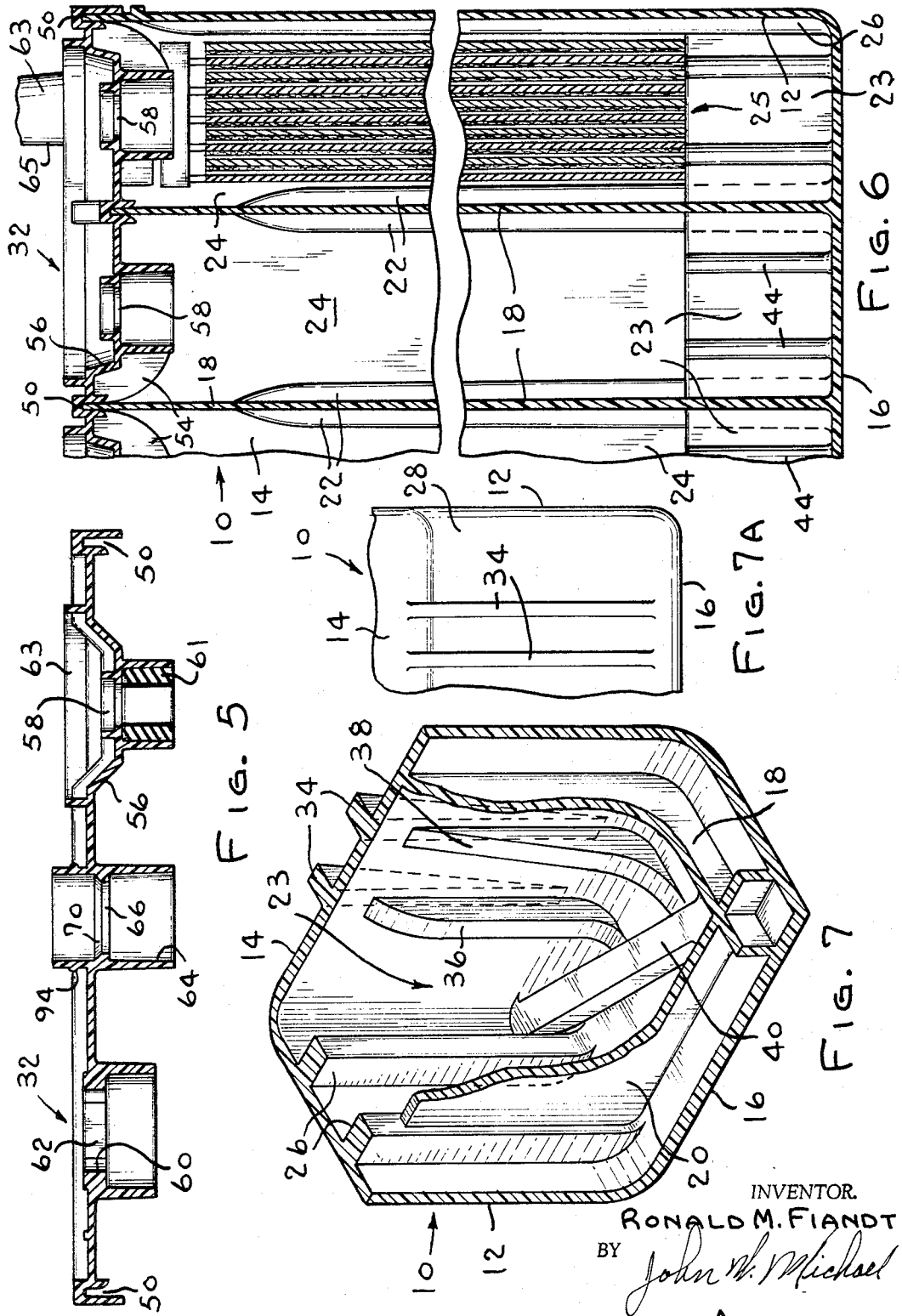

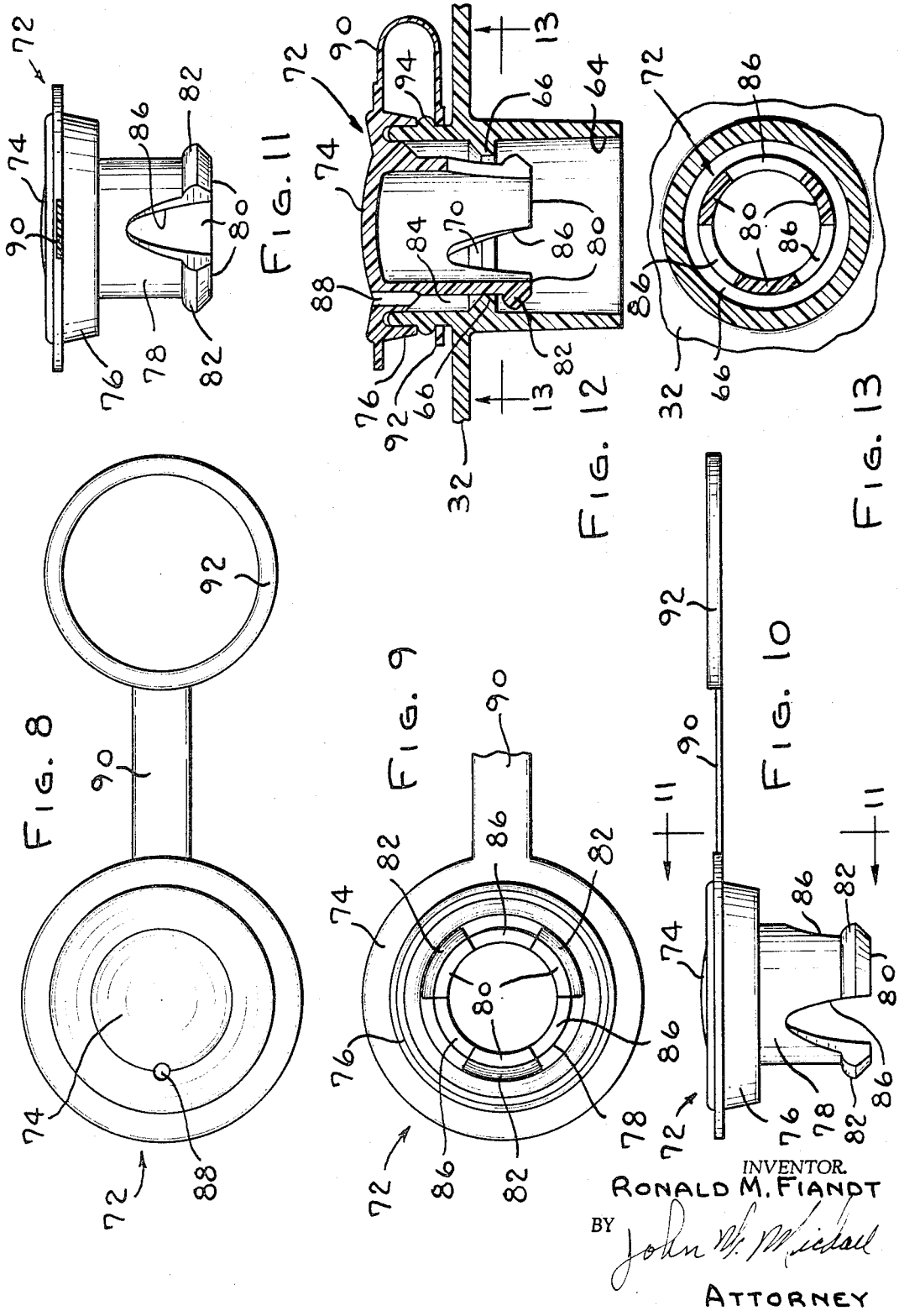

United States Patent Office 3,388,007
Patented June 11, 1968

3,388,007
THIN WALL POLYPROPYLENE
BATTERY CASE
Ronald M. Fiandt, Menomonee Falls, Wis., assignor to Globe-Union Inc., Milwaukee, Wis., a corporation of Delaware
Continuation-in-part of application Ser. No. 428,890, Jan. 7, 1965. This application Oct. 21, 1966, Ser. No. 607,087
15 Claims. (Cl. 136—166)

ABSTRACT OF THE DISCLOSURE

This disclosure relates to a battery case and cover made of polypropylene and wherein the case will, including the cell partitions, have a thickness not in excess of 0.100 inch. Also, the thickness of the cover does not exceed 0.100 inch. The case walls and partitions have a substantially uniform thickness throughout their respective planar extensions. Where a taper, or draft, is provided in the partitions the average thickness of the partitions equals the thickness of the walls they engage. Reinforcing ribs are provided on the partitions and, when used, have the same taper and thickness as the partitions.

In its more specific aspects, the cover is provided with transverse grooves for receiving the partitions and the grooves project above and below the main cover panel; extensions are provided at the grooves to guide the partitions into the grooves. An offset is provided in a pair of opposed case walls and adjacent the bottom of the case. The offset serves to reinforce the case and also to properly locate the cell element assemblies. Also, a specific vent cap is provided. The cap fits into the battery fill opening but is spaced from the opening walls and provides limited access from the battery to the area between it and fill opening walls. A vent opening in the cap communicates with the battery interior only through the area between the cap and the fill opening walls. The vent cap is connected to the fill opening by a hinge connection.

---

This invention is a continuation-in-part of copending application of Ronald M. Fiandt Ser. No. 424,890, filed Jan. 7, 1965, entitled, "Battery Case," and which was a continuation-in-part of Ser. No. 125,207, filed July 19, 1961, and also entitled, "Battery Case," both applications having been assigned to the assignee of this application and are now abandoned.

This invention relates to storage batteries and, more particularly, to an improved container for such batteries.

Storage batteries consist of a number of cell groups placed in the electrolyte in separate cell compartments within the battery case and held therein by the cover. The cases for such batteries are catalogued in groups by shape and cell number and within a group the outside dimensions are standardized. The cases and covers, as presently available, are generally molded from plastic by compression molding techniques and have walls, bottom and partitions of average thickness in excess of 0.200 inch. This thickness materially restricts the volume available within the case for active material.

The primary object of this invention is to provide a storage battery and a battery container therefor which, while maintaining the same standard specified outside dimensions, has increased battery capacity, strength, impact resistance and resistance to softening, decreased weight, and reduced cost of manufacture; and another object of this invention is to provide a battery case, and cover, which has three desirable characteristics while remaining substantially stress free.

These objects are accomplished by the high speeed injection molding of a battery case and cover using a light, high tensile strength, high impact strength, mar-resistant plastic material inert to acid and oxidation, and having a high softening point, preferably polypropylene. When used in accordance with this invention, i.e., together with tools, techniques and designs to be described more completely hereinafter, the material has high temperature stability (a high softening point), improved low temperature strength and can be used with wall, bottom and partition thickness of not in excess of 0.100 inch. The outside dimensions of the battery container are kept within the standard limits set for the group in which the battery is classified. The partitions and the case walls parallel to the partitions, whether the battery is of side-by-side or end-to-end type construction, can be provided with vertical ribs which act to both stiffen the thin walls and to space cell groups from the walls and partitions for the free flow of electrolyte. The resulting reduction in the thickness of the case walls, partitions and case bottom, as compared to prior battery constructions, makes possible an increase in the amount of electrolyte which can be used in the battery and/or an increase in the number and size of the plates in the cell groups. Also an improved balance of electrolyte and plate material is achieved. This increase in and the better balance of electrolyte and plate material makes possible an approximate twenty percent increase in battery capacity than has been possible heretofore.

Furthermore, in accordance with another aspect of this invention the increase in battery capacity is achieved with a stress free case and cover to thereby insure a battery container having an acceptable useful life. This stress free characteristic is achieved by making the case and cover of substantially uniform thickness throughout. For example, the case walls and partitions are of substantially uniform thickness throughout their respective planar extensions and abutting portions are of equal thickness with respect to each other at any typical transverse cross section in a plane parallel to the case bottom. This uniformity of thickness permits accurate temperature and flow control during the molding process and results in the molding material solidifying at a uniform rate within any given case or cover portion and between abutting case or cover portions. This prevents the creation of internal stresses which might otherwise occur, e.g., as the result of uneven solidification between sections of different thicknesses. In instances where other design considerations dictate a variation in thickness or use of sections of different thickness, the variations in thickness are controlled and the sections are arranged to permit accurate control over the cooling thereof so that the cooling rates of the sections can be controlled to achieve simultaneous solidification.

Another object is to design a more economical battery case having not only less material but also a case that can be injection molded at high speeds and still obtain the above characteristics.

Another object of this invention is to provide a battery case with cell forming partitions and a cover which closes the case and cells and is sealed thereto.

Another object is to provide a single integral molded cover which seals the several cell compartments in a storage battery one from the other in a manner so as to preclude the possibility of electrolyte or electrical leaks.

A final object is to provide an improved vent cap for a storage battery that is simple to manufacture, cannot be misplaced, is easily fitted on and removed from the filling openings of the cover, and will provide proper venting without loss of electrolyte.

The high speed injection molding of the battery container is accomplished by injecting molten polypropylene into the mold under high pressure and temperature. Fast, uniform feed is accomplished by the use of multiple gates positioned in a balanced relationship to the bottom area, partitions, and side walls of the case, this combined with the inertia of the cores provides unique and unexpected results while utilizing molding techniques which are contra to accepted molding theories. This further contributes to the provision of an improved case free of weld marks and internal stresses. The cover is likewise molded as an integral unit with terminal openings, filter holes and sealing grooves provided therein.

Other objects and advantages will be pointed out in or be apparent from the description and claims, as will obvious modifications of the single embodiment shown in the drawings, in which:

FIG. 5 is a section view of the cover taken on line 5—5 of FIG. 1;

FIG. 6 is a section view of the battery taken on line 6—6 of FIG. 1;

FIG. 7 is a perspective view of the corner of the case showing the reinforcing ribs;

FIG. 7a is a detail view of the corner of the case showing the external reinforcing ribs;

FIG. 8 is a top plan view of the vent plug and connector ring;

FIG. 9 is a bottom view of the vent cap;

FIG. 10 is a side view of the vent cap;

FIG. 11 is an end view of the vent cap taken on line 11—11 of FIG. 10 of the vent cap;

FIG. 12 is a section view of the vent cap locked on the vent opening of the cover; and FIG. 13 is a section view of the bottom of the vent cap taken on line 13—13 of FIG. 12.

Figure 1:
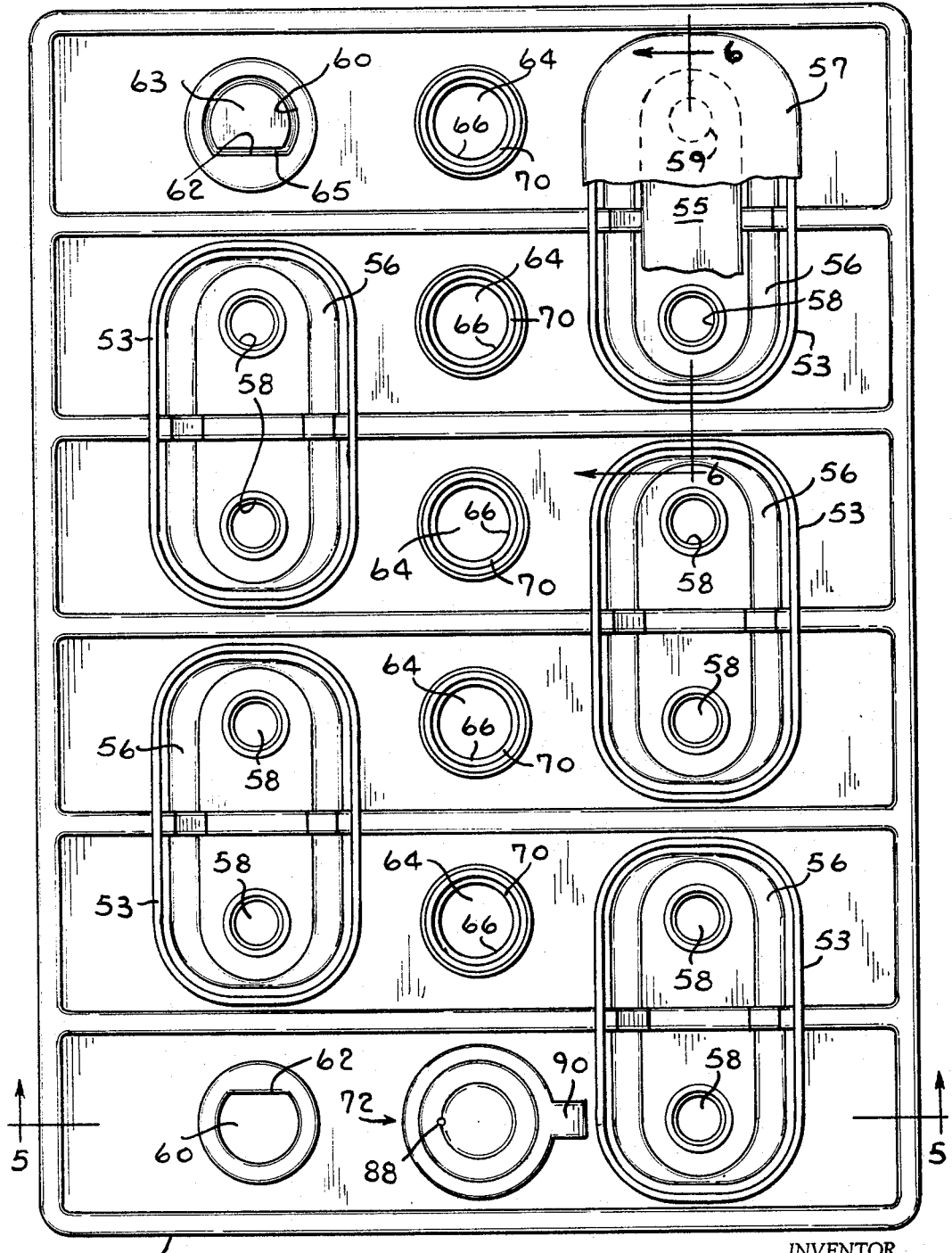
FIG. 1 is a top view of a battery, battery case and cover for battery case embodying the present invention, only one cell or compartment is shown with a cell group positioned therein, parts are broken away for sake of clarity, and only one vent cap is shown in place.

Referring more particularly to the drawings, a standard six cell, twelve volt battery is shown with cells 24 arranged in a side-by-side relation. This type of battery is used by way of example only since the invention is applicable to a six volt battery and the same results can be obtained with the cells arranged in end-to-end relationship, that is, two three cell units in end-to-end relation or three two cell units in end-to-end relation. One one-cell group 25 is shown in one cell of the case in order to simplify the description of the invention. The battery is a completely welded unit having a single integrally molded cover 32 heat sealed to a single integrally molded case 10 with the cells isolated one from the other.

The battery case has end walls 12, side walls 14, and a bottom member 16. The case is divided into cells 24 by transverse partitions 18 molded integrally with the side walls. Cell groups supporting flanges 20 molded integral with the bottom member and the end walls and transverse to the partitions form sediment chambers 23 in the bottom of the case. Lateral spacers 22 are formed on the partitions to space the cell groups, such as shown at 25, from the partitions to allow for the free flow of electrolyte in the compartments.

The end walls have a number of ribs 26 molded on their internal surfaces to increase the stiffness of the wall and also to act as spacers when required for the cell group in the cell compartment adjacent the end wall. The side walls have an inward offset 28 near the bottom of the case with the internal surface of the side wall below the offset engaging the sides of the cell groups in the compartments to hold them in position on the supporting flanges. Each partition may have a notch 30 on its upper edge which, in combination with recesses 56 in cover 32, as described hereinafter, provide for the interconnection of the cell groups. Where an intercell connection through the partition wall is used to connect the cell groups, for example the type disclosed in the co-pending application of Anthony Sabatino and Daniel Orland, Ser. No. 132,660, filed Aug. 21, 1961 and assigned to the assignee of this application, the notch is omitted and the partition walls are punched to provide for the intercell connection.

The walls are stiffened by the ribs and the partitions, and the bottom is stiffened by the supporting flanges and the partitions so that they are strong enough to stand up to a considerable amount of rough handling without any serious damage to the case. It had been found, however, that the corners of the case were subject to damage because of the forces sometimes incurred at the corners of the case when the batteries are loaded for shipment. The corners have, therefore, been reinforced to overcome this by molding ribs 34 on the lower external surface of the side wall of the case, integral with the offset 28. Ribs 36 and 38 are provided on the interal surface of the lower side wall opposite the external ribs 34 and are integral with the bottom member. A diagonal rib 40 is molded along the bottom member from the corner of the case to the intersection of the partition with the supporting flange. This structure not only prevents an impact force on the corner from buckling the bottom wall but also directs the force to the intersection of partition 18 and supporting flanges 20 thereby distributing the force in all directions through this strong point. The internal and external ribs are molded integral with the offset in the side wall and the bottom member to form a brace that will resist any tendency of the side wall to buckle or turn in. The diagonal rib will resist any tendency of the bottom member to buckle or turn in. The end walls are reinforced by ribs 26 and therefore do not require any further reinforcement. Alternative arrangements may be used for reinforcing the corner, such as increasing the radius of the corner, but the present arrangement has proven to be considerably stronger than the corners of cases presently on the market and is preferred as it both maintains a substantially uniform thickness, as will be discussed more completely hereinafter, and requires a minimum of material.

Figure 3:
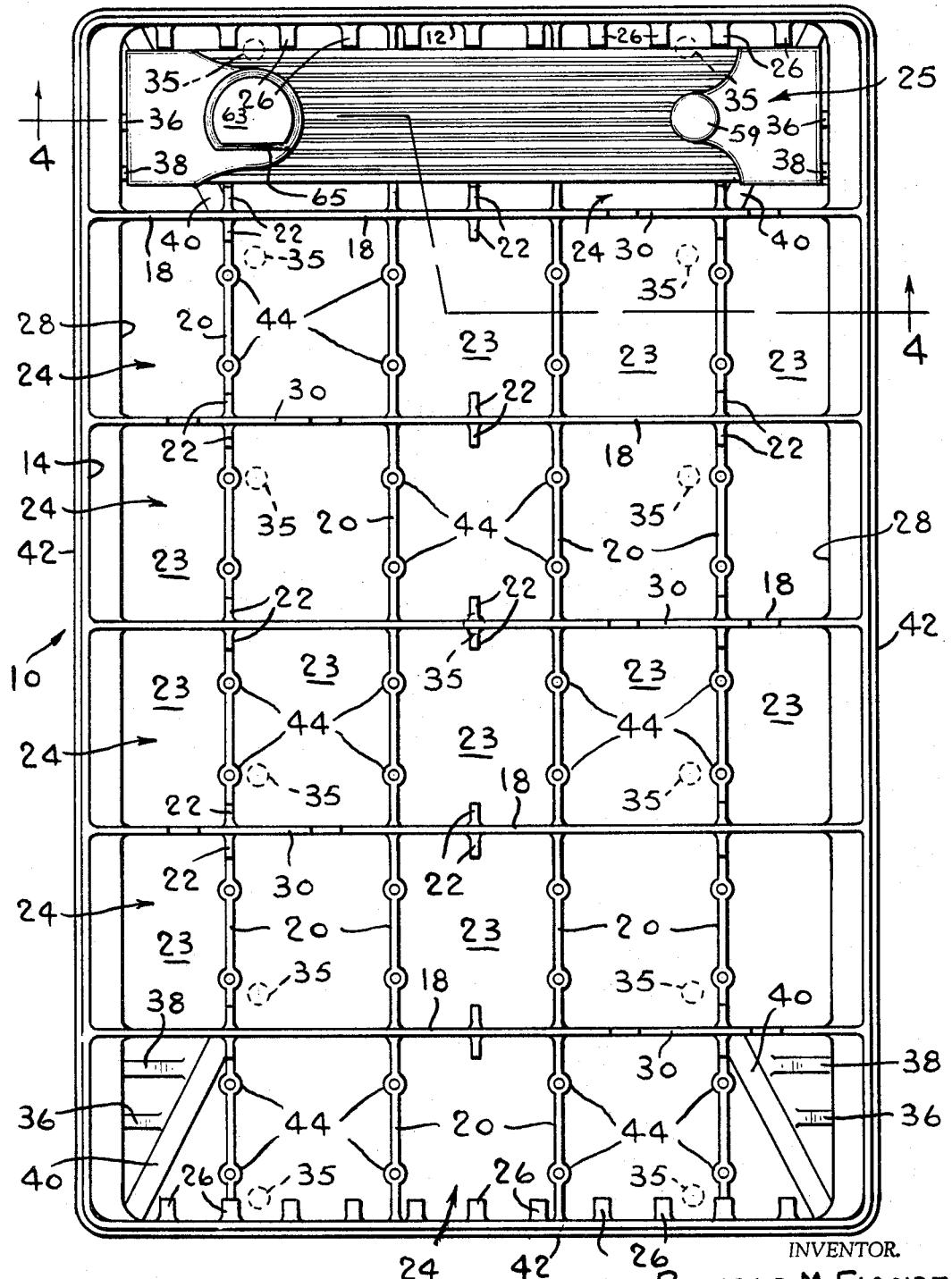
FIG. 3 is a top view of the battery with the cover removed and the cell group shown in one of the cell compartments.
Figure 4:
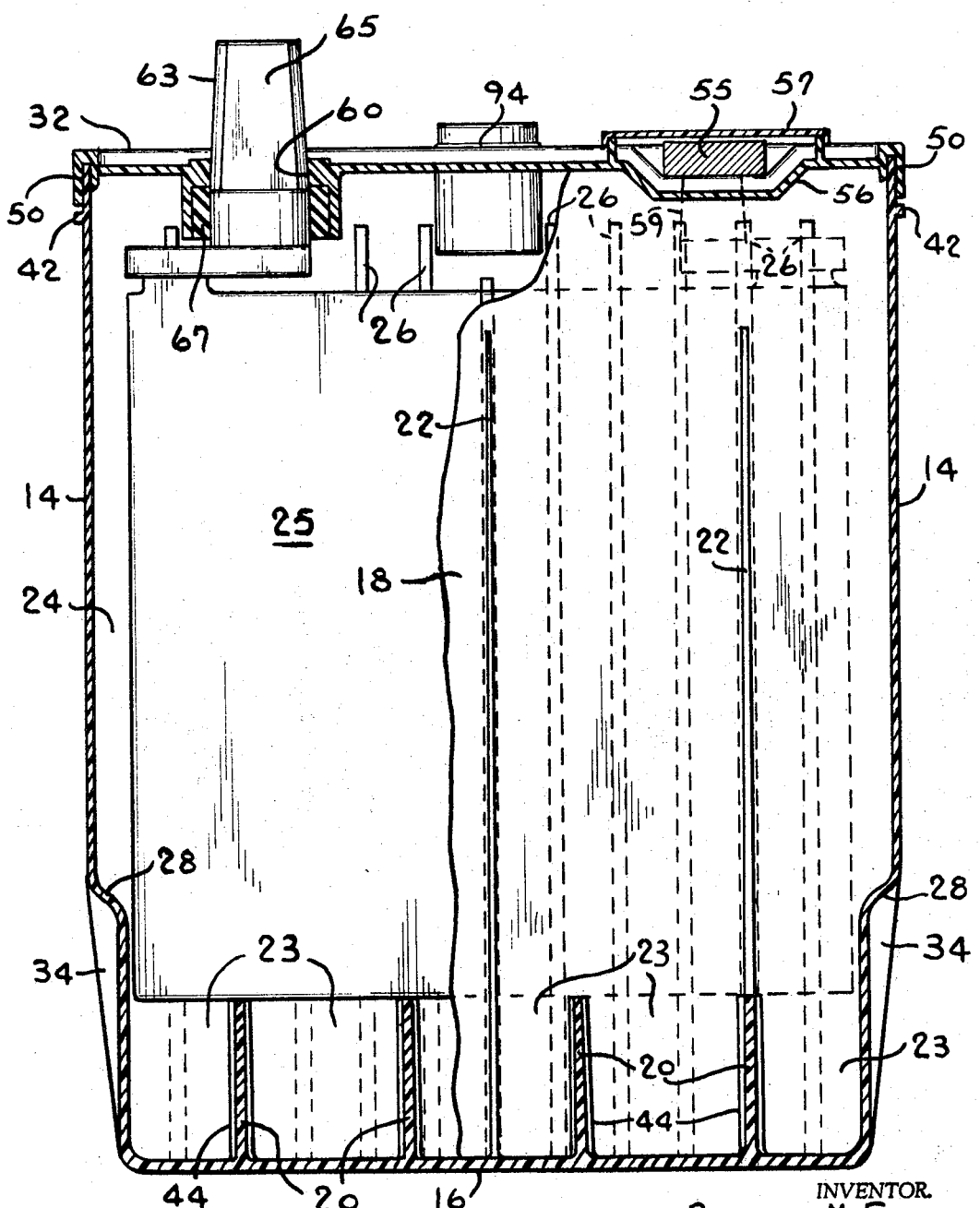
FIG. 4 is an elevation view taken on line 4—4 of FIG. 3 showing stiffening ribs on the partition and wall and the position of the cell group in the cell compartment.

The case has been designed for production by an injection molding method with the walls, bottom member, and partitions having a thickness not in excess of 0.100 inch. This represents a considerable reduction in thickness as compared to heretofore available and accepted battery constructions and, as will be discussed more completely hereinafter, permits an increase in the amount of electrolyte which can be used within standardized battery dimensions and also permits proper proportioning of the amount of electroylte with the plate area in each cell. To achieve this reduction in wall thickness while providing a structurally sound case and an acceptable battery case and cover, the case is preferably molded of polypropylene, as will be discussed more completely hereinafter, and the case walls, bottom and partitions are suitably reinforced. The cover can be molded of the same material. Moreover, the case and cover are provided in a substantially stress free state to prevent in-service failure of the case or cover during the battery's useful life. Stresses set up during fabrication may not become known before the battery is placed in service and may not result in failure until one, two or three years after the batteries are manufactured. More specifically and as is illustrated in FIGS. 3, 4 and 6, battery side walls 14 are of uniform thickness throughout their planar extensions so that accurate temperature and flow control of the molding material is possible during the molding process and the side walls will solidify at the same rate throughout thereby resulting in side walls which are free of stresses. Similarly end walls 12 and bottom 16 are of uniform thickness throughout their respective planar extensions.

The battery side and end walls can be of precisely uniform thickness throughout their extensions since they can be manipulated to clear the mold, as can the bottom wall which is not drawn from the mold in the same manner as the side and end walls. However, cells 24 are cored and virtually inaccessible in the mold and unless partitions 18 are provided with a draft they cannot be withdrawn from the mold. A draft is therefore provided in the partitions but, consistent with the objective of achieving a stress free case, it has been discovered that a draft can be used which is considerably less than that which would be dictated by normal molding techniques. More specifically, a normal draft would be approximately 0.025–.030 per inch whereas the draft in this instance is approximately .0037 per inch, i.e. the draft in accordance with this invention is approximately 10% of the normal draft. This specific draft was found to provide uniform cooling characteristics. A normal draft not only produces a substantial variation in thickness and would result in substantial internal stresses but would also reduce the cell capacity and increase the amount of material required.

Specifically, a battery case constructed in accordance with this invention had partitions which tapered from .080 inch at the bottom wall to .050 inch at their top and over a length of approximately 8.100 inches. With this taper the partitions exhibited virtually the same cooling characteristics as though they were of uniform length throughout the walls having this taper can be considered as though they were of uniform thickness throughout. Therefore, the use of uniform thickness in this application is intended to include variations such as this taper, i.e. a tapered section which does not vary in thickness substantially any more than approximately .0037 inch per inch. Moreover, in this particular instance the side and end walls were provided with a thickness of .065 which, it will be noted, is equal to the average thicknesses of the partitions so that, as an average, the thickness of abutting partitions and side walls are substantially equal at any typical transverse cross section parallel to the case bottom to further contribute to the provision of a stress free case. In this regard, spacers 22 and flanges 20 were provided with a thickness and draft identical to that of the partitions so that at any typical transverse cross section the partition and spacers and flanges are of uniform thickness.

Since the bottom of the case will be subjected to more wear, it is in some instances made thicker than the side and end walls, e.g. in the case discussed above the bottom was .090 inch thick. It has been discovered that this difference in thickness can be used without detrimentally affecting the case because the case bottom is externally exposed and can be separately cooled at a faster rate than the end and side walls so that the bottom solidification time will be simultaneous with that of the end and side walls. Therefore, although the solidification times of elements of different thicknesses are substantially equal, it will be appreciated that the solidification rates can be varied to achieve this end. Similarly, where other design considerations dictate an element thickness which varies from that of the member which it abuts that element is arranged so that it can be separately cooled at the proper rate to achieve simultaneous solidification. For example, reinforcing ribs 26 for the end walls are thicker than the end walls to provide desired support, but this is not detrimental to the case because the reinforcing ribs project into the cell which is cored during molding and engage the core which can be cooled separately at the necessary rate. In molding the battery case discussed above it was discovered that satisfactory results were achieved by separately cooling the cell cores, the case bottom and side and end walls.

It should be noted that this uniformity in thickness is carried through the case elements as is the uniformity in thickness between abutting elements. For example, shoulder 42 is provided around the outer periphery of the case and a number of knockout members 44 are molded into supporting flanges 20 to provide surfaces which can be used for pushing the case from the mold. Projection 42 has the same thickness as side and end walls 12 and 14 and knockout members are hollow so that the thickness of the walls thereof is generally uniform with the remainder of flanges 20.

The plastic material used in molding the case is heated to a temperature two to three hundred degrees Fahrenheit above the melting temperature of the material and is injected in molten state at high speed into the mold, say within one second, at a number of points 35 generally indiacted in FIG. 3. This high speed injection of the molten material provides rapid and even distribution of material throughout the mold so that the resultant case is free of weld marks thereby eliminating that factor as a possible source of internal stresses.

A general purpose high impact grade of polypropylene has proven to be the most acceptable material for the battery container as it is lightweight, has a high tensile strength and high impact strength, exhibits high temperature stability and low temperature strength and is mar-resistant. It also has:

(1) a specific gravity (73° F.) of 0.905 to 0.965;
(2) a tensile strength of approximately 5.000 p.s.i.;
(3) an impact strength range in ft.-lb./in. (Izod unnotched) of 17 at −40° F. to 25 at 0° F. to above 33 at room temperature; and
(4) a Rockwell hardness range of 63 to 95.

This material permits the thin wall construction of this invention while affording the physical characteristics mentioned above to thereby provide an overall improved container. Initially, it appeared that other materials might exhibit characteristics equivalent to polypropylene so that they too could be used in molding this type of battery container, e.g. low pressure (high density) polyethylene and high impact polystyrene. However, further investigation has indicated that these other materials are generally deficient for one reason or another. For example, polyethylene does not exhibit acceptable high temperature stability as it softens to too great a degree at elevated temperatures within the standard temperature range specifications for battery containers and polystyrene becomes too brittle at low temperatures in that range so that it does not afford the necessary low temperature strength.

Figure 2:
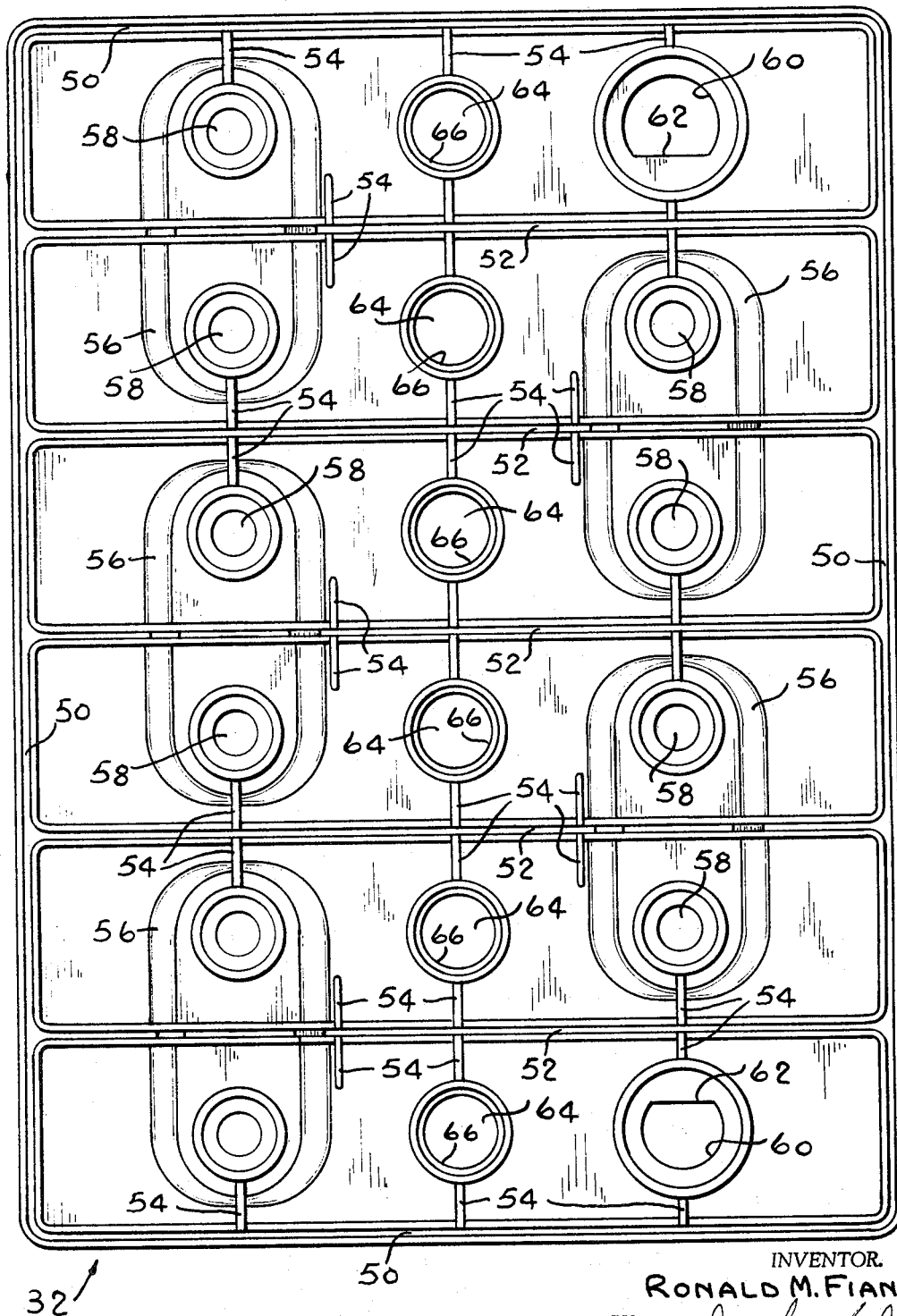
FIG. 2 is a plan view of the bottom of the cover.

As seen in FIGS. 1, 2 and 5, the cover comprises a single molded unit having a groove 50 around its outer perimeter to engage the walls and grooves 52 spaced across the cover for engagement with the partitions of the case. Guide flanges 54 are molded on the internal surface of the cover transverse to the axis of the grooves to aid in aligning the upper edges of the walls and partitions in the grooves when the cover is placed on the case. As seen in FIGS. 5 and 6, the top of the grooves projects above the surface of the cover so that the cross section of the top of the groove is the same as the cross section of the cover. This is important in molding the cover since the flow lines of the material will be the same, thus providing an even distribution of the cover material without internal stresses being set up. Furthermore, as can be seen in FIGS. 5 and 6, the cover is of uniform thickness throughout with minor exceptions such as the increase in thickness of terminal openings 60 which is required for the reason to be discussed hereinafter. This variation in thickness can virtually be disregarded or should this variation have adverse effects, the cooling rate of the thicker area at the openings can be easily controlled as it is adjacent a cored area (that for opening 60) in the mold.

The sides of the groove are supported by the surface of the cover to prevent distortion in sealing the cover on the case as explained hereinafter. The connector wells 56 with raised rims 58 outwardly canted approximately 6° fit into the notches 30 in the partitions and include openings 58 for the terminals 59 of the cell group which are sealed by rubber bushings 61. The terminals are connected by a connector 55 to the adjacent terminal (not shown). Connector well covers 57 may be provided on the connector wells to insulate and enclose the connectors. The edges of the covers are canted inward slightly so the cover will drop onto the rim of the connector wells to form a water tight seal. The rims of the connector wells form a vertical barrier which prevents dirt and moisture from accumulating close to the terminals thus providing a high resistance path between the terminals of a cell group.

Primary terminal openings 60 are provided on opposite ends of the case and include a flat surface 62 to engage a corresponding flat portion 65 of the primary terminal 63 and prevent any rotary motion from occurring between said primary terminal and the cell groups when the battery is connected or disconnected to the power line. This type of terminal opening will prevent the primary terminal connector from being twisted off of the cell group in connecting or disconnecting the battery to the circuit and, as was mentioned above, the cover has an increased thickness at the terminal opening to better resist twisting forces. The primary terminal is sealed by a rubber bushing or a lead seal 67.

Filler openings 64 are molded in the cover with a shoulder 66 provided on the internal surface of the opening. The upper surface 70 of the shoulder is angled slightly downward to aid in mounting the vent plug in the opening and to return electrolyte to the battery case as explained hereinafter.

As seen in FIGS. 8 through 13 a plug-in type vent cap 72 is contemplated for use with the filler opening provided in this cover but the opening can be modified for a conventional plug-in or screw type vent cap if desired. The cap is molded as a single unit having a top 74, an outer annular flange 76 and an inner tubular section 78 having three projections 80 with lugs 82 at their lower ends. The cap is inserted into the filler opening until the lugs snap below the shoulder with an annular space 84 located between the internal surface of the opening above the shoulder and the outer surface of the tubular section. Spaces 86 between the projections provide an air path from the interior of the battery to the annular space which is connected to atmosphere through a vent 88 in the cover located to be centrally spaced behind one of these projections. If the electrolyte should splash into the interior of the tubular section, it will generally splash against the top of the cap and flow back into the battery. If the electrolyte does pass through the spaces in the tubular section into annular space 84, it will splash against the sides of the opening and flow downward onto the angular surface of the shoulder and back through the spaces between the projections on the cap. The cap is designed so the lugs are cammed inwardly by the angled portion 70 of shoulder 66 and snap below the shoulder but do not exert any downward pressure on the cap that would unduly stress the plastic material thus preventing the possibility of the cap becoming distorted. A hinge 90 and ring 92 may be molded onto the cap if desired to secure the cap to the opening by pressing the ring onto the outer perimeter of the opening below shoulder 94.

The increased volume resulting from the use of a properly designed thin walled case has made it possible to properly proportion the amount of electrolyte with respect to an increased number of plates in each cell group, thereby producing an approximate 20% increase in battery capacity. The following table shows the results obtained in using a standard six cell, twelve volt battery having a conventional phenolic rubber case and a six cell, twelve volt battery using the thin walled case, both of the cases having the same outside dimensions.

| Standard Battery Case | Thin Wall Battery Case | Percent |
|---|---|---|
| A) Twenty-hour Capacity (cycle) 60 amp.-hrs. | 75 amp.-hrs. | 25 |
| B) Cold Start Test: | | |
| (1) Five second voltage at 0° F. and 150 amps., 8.6 v. | 9.55 v. | 11 |
| (2) Discharge time at 0° F. and 150 amps., 4.8 min. | 5.8 min. | 21 |

Both batteries had nine plate cells but the thin walled battery had plates that were approximately a half inch longer because of the increased space available in the case. The increase in capacity was, therefore, made possible through the increased size of the plates and the increased amount of electrolyte.

In a subsequent test made with a battery having the thin walled case and the same outside dimensions as the standard case, an eleven plate cell group was used in the battery with the following results:

(A) Twenty-hour capacity _____amp. hrs__ 80
(B) Cold start:
   (1) Five sec. at 0° F. and 150 amp. _____v__ 9.90
   (2) Time discharge at 0° F. and
       150 amp. _____min__ 7.1

These results show an additional increase in battery capacity using a thin walled case which is not possible with the cases presently on the market. With the present space limitations in the available case, it is not possible to use an equivalent eleven plate cell group and a comparison with a battery using this type of casing with the same outside dimensions is therefore not possible.

Although but one embodiment of the present invention has been illustrated and described, it will be apparent to those skilled in the art that various changes and modifications may be made therein without departing from the spirit of the invention or from the scope of the appended claims.

I claim:

1. A storage battery having a case made of polypropylene and having a bottom, side walls, end walls and partitions defining a plurality of cells, and cell groups in said cells, said case being characterized by having standardized outside dimensions, and said bottom, side walls, end walls, partitions, and cover having thicknesses not in excess of 0.100 inch.

2. The storage battery of claim 1 including a cover also made of polypropylene.

3. A storage battery according to claim 2 including a plurality of laterally spaced ribs connected to the walls and partitions of said case adjacent to the sides of said cell groups and projecting inwardly into said cell from said walls and partitions to space said cell groups from said walls and partitions and to stiffen said walls and partitions.

4. A storage battery according to claim 3 in which one pair of opposed walls have an inwardly offset portion adjacent said bottom to form an external shoulder and an inner guide for cell groups in said cells, said cell groups in engagement with said inner guides.

5. A storage battery according to claim 2 wherein said cover comprises a molded panel, a groove molded around the outer perimeter of the panel for engagement with the edges of the case, transverse grooves molded in the panel for receipt of and engagement with the partitions, said transverse grooves being recessed into the panel and projecting above and below the surfaces of the panel so that said panel is arranged intermediate the ends of said grooves to reinforce said groove.

6. A storage battery according to claim 5 wherein said cover further includes terminal openings for engagement with terminals on said battery cell groups, said openings having a chordal flat surface therein to prevent rotary motion of the terminals with respect to the cover.

7. A storage battery according to claim 6 wherein said cover further includes guide flanges disposed adjacent said grooves, said guide flanges extending beyond said grooves away from said panel and transversely of the grooves to aid in seating the cover on the battery case.

8. The storage battery of claim 2 wherein said cover includes filler openings having an annular shoulder molded to the inner surface thereof and including a vent cap having a top portion for engaging and closing the filler opening and a tubular section engaging the annular shoulder to form an annular chamber between the opening and the tubular section, said top portion including a vent connected to said chamber, the tubular section including a number of projections equally spaced about the axis of the tubular section, said projections including lugs for engaging the shoulder, the spaces between the projections communicating with said chamber and allowing for the free flow of air from the vent through the chamber to the battery.

9. A storage battery case comprising, a bottom, upstanding walls extending from said bottom, a plurality of upstanding partition walls extending from said bottom and said walls to cooperate therewith in defining a plurality of cells, said case characterized by being made of polypropylene and said walls having a thickness not greater than 0.100 inch and said walls and partitions being of substantially uniform thickness throughout their respective planar extensions.

10. A storage battery case according to claim 9 including upstanding reinforcing ribs connected to and extending laterally from said walls into said cells.

11. A storage battery case according to claim 9 wherein said partitions have a taper and the average thickness of said partitions is equal to the thickness of said walls.

12. A storage battery case according to claim 9 wherein reinforcing ribs are provided on said partitions and said ribs and partitions have an equal thickness and draft.

13. A case for a storage battery having a bottom, end and side walls and transverse partitions integral with said walls and bottom and extending parallel to one of said end walls and side walls for separating the case into a number of cell compartments for battery cell groups, said case made of polypropylene and the walls, partitions and bottom thereof characterized by being less than 0.100 inch thick, and rib spacers connected to the walls parallel to said partitions, said walls and partitions being of substantially equal thickness at any transverse cross section taken parallel to said bottom.

14. A storage battery case according to claim 13 including reinforcing rib spacers connected to said partitions and having a thickness substantially equal to that of said partitions.

15. A storage battery case according to claim 14 wherein said partitions and said reinforcing rib spacers on said partitions have an equal taper.

References Cited

UNITED STATES PATENTS

| | | | |
|---|---|---|---|
| 1,888,890 | 11/1932 | Sandman | 136—166.2 X |
| 1,947,158 | 2/1934 | Henry. | |
| 2,481,558 | 9/1949 | Appel | 136—166.2 |
| 2,971,045 | 2/1961 | August | 136—178 |
| 3,075,036 | 1/1963 | Shank et al. | 136—170 X |
| 3,077,509 | 2/1963 | Broussard | 136—170 |
| 3,092,438 | 6/1963 | Kruger | 136—146 X |
| 3,113,892 | 12/1963 | Albrecht | 136—168 |

FOREIGN PATENTS

| | | |
|---|---|---|
| 241,006 | 1/1960 | Australia. |
| 1,091,183 | 4/1955 | France. |

OTHER REFERENCES

Delmonte, Plastics in Engineering, pub. by Penton Publishing Co., 1940, p. 275.

WINSTON A. DOUGLAS, *Primary Examiner.*

D. L. WALTON, *Assistant Examiner.*